United States Patent
Niemelä

(10) Patent No.: US 6,597,148 B1
(45) Date of Patent: Jul. 22, 2003

(54) METHOD FOR CONTROLLING AN ELECTRICAL MACHINE AND AN INVERTER

(75) Inventor: Markku Niemelä, Lappeenranta (FI)

(73) Assignee: ABB Oy (FI)

( * ) Notice: Subject to any disclaimer, the term of this patent is extended or adjusted under 35 U.S.C. 154(b) by 0 days.

(21) Appl. No.: 09/913,348

(22) PCT Filed: Feb. 14, 2000

(86) PCT No.: PCT/FI00/00104
§ 371 (c)(1),
(2), (4) Date: Sep. 13, 2001

(87) PCT Pub. No.: WO00/49708
PCT Pub. Date: Aug. 24, 2000

(51) Int. Cl.$^7$ ................................................ H02P 5/28
(52) U.S. Cl. .................. 318/727; 318/809; 318/823; 318/825
(58) Field of Search ................ 318/727, 809, 318/823, 825

(56) References Cited

U.S. PATENT DOCUMENTS

| 4,051,419 | A | * | 9/1977 | Takahashi | .......... 318/721 |
|---|---|---|---|---|---|
| 4,609,983 | A | * | 9/1986 | Braun | ............ 323/207 |
| 4,926,104 | A | * | 5/1990 | King et al. | .......... 318/599 |
| 4,989,128 | A | * | 1/1991 | Ohyama et al. | ........... 363/132 |
| 5,097,193 | A | * | 3/1992 | Neis et al. | .......... 318/800 |
| 5,834,910 | A |   | 11/1998 | Tsurumi et al. | ........... 318/139 |
| 5,959,430 | A | * | 9/1999 | Yuki et al. | .......... 318/805 |

FOREIGN PATENT DOCUMENTS

| EP | 0 638 457 | 2/1995 |
|---|---|---|
| JP | 2142393 | 5/1990 |
| JP | 4079787 | 3/1992 |

* cited by examiner

*Primary Examiner*—Rita Leykin
(74) *Attorney, Agent, or Firm*—Dykema Gossett PLLC

(57) ABSTRACT

A method for controlling an electrical machine while it is connected to an inverter comprising phase-specific switching components generating an output voltage, an optimum switching table arranged to select a switching combination for the switching components on the basis of the stator flux and torque of the electrical machine, the method comprising steps of defining the stator current vector ($i_s$) of the electrical machine, and determining the rotation speed of the electrical machine. The method also comprises the step of defining a switching combination for the switching components on the basis of the stator current vector ($i_s$) and stator current reference vector ($\psi_{s,ref}$) of the electrical machine when the determined rotation speed is lower than a predefined limit.

5 Claims, 1 Drawing Sheet

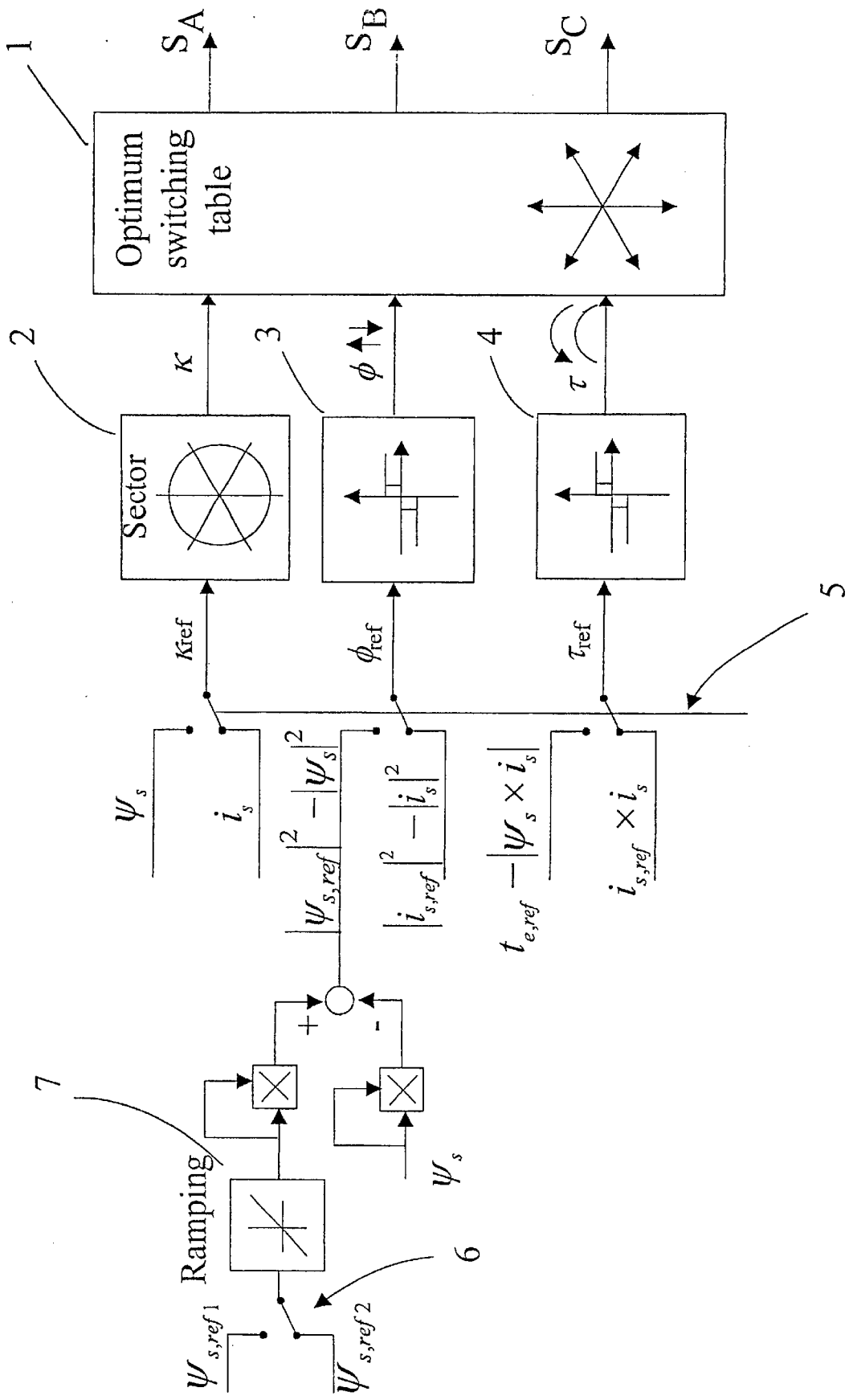

METHOD FOR CONTROLLING AN ELECTRICAL MACHINE AND AN INVERTER

BACKGROUND OF THE INVENTION

The invention relates to a method for controlling an electrical machine and to an inverter, the electrical machine being connected to the inverter comprising phase-specific switching components generating an output voltage, an optimum switching table arranged to select a switching combination for the switching components on the basis of the stator flux and torque of the electrical machine, the method comprising steps in which the stator current vector and the rotation speed of the electrical machine are determined.

To reliably control electrical machines at a wide speed range without a direct feedback on the rotation speed or position angle causes considerable problems in the present control systems of machines. Especially when the electrical machine is a synchronous motor, the control of the rotation speed in all speed ranges is difficult due to the inaccuracy of the estimation of the stator flux which is the base for many control systems. This problem is especially enhanced when operating at low rotation speeds. A rotating-field machine, such as a synchronous machine, can be started using modern control methods based on direct torque control, but the load properties of the machine remain inadequate at low rotation speeds. In practice, it is, however, not possible to use methods based on direct torque control continuously at zero speed and low rotation speeds without feedback on the rotor position angle.

An error forms between the actual stator flux and the estimate formed of it in drives based on direct torque control. In such drives, the drifting of the stator flux is usually corrected by using a current model made for the machine. The use of a current model cannot, however, prevent a static torque error. A rotating-field machine can be controlled reliably at low rotation speeds by using stator current control in which the operation of the machine is controlled on the basis of the stator current.

BRIEF DESCRIPTION OF THE INVENTION

It is an object of the present invention to produce a method avoiding the above-mentioned drawbacks and making it possible to reliably control an electrical machine at a wide rotation speed range utilizing a transfer from one control method to another when the rotation speed changes. This object is achieved by a method of the invention characterized in that the method also comprises a step in which a switching combination is defined for switching components on the basis of a stator current vector and a stator current reference vector of the electrical machine when the determined rotation speed is lower than a predefined limit.

The method of the invention is based on the idea that at higher rotation speeds the electrical machine is reliably controlled utilizing a control method based on direct torque control, but at lower rotation speeds the control method is changed to one based on stator current control. The change of control method provides a considerable advantage in that the drive remains stable even at low speeds.

The invention also relates to an inverter comprising phase-specific switching components generating an output voltage, an optimum switching table arranged to select a switching combination for the switching components on the basis of defining values, and a frequency definition element arranged to determine the rotation speed of the electrical machine controlled by the inverter. The inverter of the invention is characterized in that the inverter also comprises a selection element arranged to change the defining values used as the basis for the switching combination for the switching components depending on the rotation speed of the electrical machine.

The inverter of the invention is based on the idea that when the rotation speed of the electrical machine exceeds a given limit value, the inverter changes the defining variables used as a basis for modulation.

By means of the inverter of the invention, the advantages provided by the method of the invention can be realized with a simple structure using the same modulator to generate output voltages both in a control method based on direct torque control and in one based on current control.

BRIEF DESCRIPTION OF THE DRAWINGS

The invention will now be described in greater detail by means of preferred embodiments with reference to the attached drawing, in which FIG. 1 shows a general presentation of the generation of an output voltage reference of an inverter according to the invention.

DETAILED DESCRIPTION OF THE INVENTION

FIG. 1 shows, on a general level, the generation of output voltage references of the inverter when utilizing an optimum switching table 1 and blocks 2, 3, 4 forming the logic variables necessary for the optimum switching table. The optimum switching table is a table containing information for all combinations of the incoming logic variables on how the output voltages of the inverter should be generated. In FIG. 1, the logic variables κ, φ, τ are formed of three blocks 2, 3, 4 receiving their individual inputs from the corresponding reference variables $\kappa_{ref}$, $\phi_{ref}$, $\tau_{ref}$. The first block 2 is a sector selector which defines the position angle of the vector variable acting as the reference variable $\kappa_{ref}$ and produces the logic variable κ as its output. The value of the variable κ thus changes as the angle of the reference variable moves from one sector to another. In the case of FIG. 1, the sector selector contains six sectors and, correspondingly, the logic variable κ can obtain six different values.

The logic variable φ affects the magnitude of the stator flu of the electrical machine and the variable can obtain three different values depicting the need to increase, decrease or maintain the present magnitude of the flux. Block 3 controlling the need to adjust the magnitude of the flux receives as input the reference variable $\phi_{ref}$ ref depicting the current value of the stator flux magnitude in comparison with the desired flux value. Correspondingly, the logic variable τ can obtain three different values. The variable τ depicts the need to increase, decrease or maintain the torque produced by the electrical machine. Block 4 controlling the change in torque receives as input the reference value $\tau_{ref}$ depicting the ratio of the torque produced by the electrical machine to the desired torque. The three above-mentioned logic variables κ, φ, τ are forwarded to the optimum switching table which, on the basis of said variables, generates the output voltage of the inverter.

Direct torque control of an electrical machine is based on the use of the above-mentioned table while the reference variables are the stator flux vector $\psi_s(\kappa_{ref})$, the difference ($\phi_{ref}$) between the squares of the absolute values of the stator flux reference vector $\psi_{s,\,ref}$ and the stator flux vector $\psi_s$, and the difference ($\tau_{ref}$) between the torque reference $t_{e,\,ref}$ and the calculated torque of the electrical machine. By using such reference variables, the electrical machine can be controlled reliably and dynamically without direct feedback data on the rotation speed or position angle of the machine. However, when the electrical machine is a synchronous machine, problems arise in defining the stator flux at low rotation speeds causing the load properties of the machine remain inadequate.

In the method of the invention, the switching combination for the switching components is defined on the basis of the stator current vector is and the stator current reference vector $i_{s,\,ref}$ of the electrical machine when the determined rotation speed is lower than a predefined limit. The same modulator formed by the optimum switching table is then used to generate the output voltage references $S_A$, $S_B$, $S_C$ of the inverter in a control method based on stator current.

The rotation speed and stator current vector of the electrical machine is determined according to the method of the invention. The rotation speed can be determined without direct measurement from the motor shaft by means of the angular speed of the stator current vector, for instance. According to the invention, the control basis is changed according to the rotation speed of the machine.

The implementation of the stator current control following the principle of direct stator flux and torque control is based on the fact that, at low rotation speeds, the proportion of the electromotive force produced by the electrical machine is small as compared with the voltage drops and the voltage of the intermediate circuit. In this case, it can be assumed that the direction of change of the stator current corresponds to the direction of the voltage vector being used. The transient inductance $L'_s$ of a rotating-field machine having a smooth air gap can be assumed to be independent of the rotor position, in which case the voltage equation corresponding to a given voltage vector is $$u_s(S_A, S_B, S_C) \approx L'_s \frac{\Delta i_s}{\Delta t}.$$

With salient pole electrical machines, the equation is not quite correct, but when the switching frequency of the inverter is high enough, it can be assumed that the direction of change of the current defined by the equation is accurate enough for stator current control. The stator current control can then be implemented on the basis of the optimum switching table using direct stator flux and torque control.

According to a preferred embodiment of the invention, the definition of the switching combination for switching components comprises steps in which the difference between the squares of the absolute values of the stator current reference vector $i_{s,\,ref}$ and the defined stator current vector $i_s$ is calculated to obtain the reference amplitude $\psi_{ref}$. This difference $|i_{s,\,ref}|^2 - |i_s|^2$ depicts the need for increasing the stator current. Block 3 adjusting the magnitude of the stator current executes the clause $\text{sign}|i_{s,\,ref}^2 - i_s^2|$, in which case the output of the block is the logic variable $\psi$ which contains the sign of the calculated difference. Block 3 contains hysteresis, if necessary, whereby the value of the logic variable remains more constant when the reference amplitude is close to zero.

According to a preferred embodiment of the invention, the vector product between the stator current reference vector $i_{s,\,ref}$ and the defined stator current vector is calculated to obtain the $\tau_{ref}$. Said vector product $i_{s,\,ref} \times i_s$ depicts the angular difference between the stator current reference vector and the stator current vector. The reference $\tau_{ref}$ obtained as the vector product is forwarded to block 4 which executes the clause $\text{sign } i_{s,\,ref} \times i_s$, i.e. produces as output the sign of the vector product, i.e. the logic variable $\tau$. The output of block 4 is further connected to the optimum switching table 1. Like block 3 adjusting the magnitude of the stator current, also block 4 comprises hysteresis, if necessary.

The definition of the switching combination for switching components, i.e. the output voltage vector, of the method of the invention comprises a step in which the switching combination for the switching components is defined on the basis of the signs of the reference amplitude $\phi_{ref}$ and the reference $\tau_{ref}$ and the position angle of the stator current vector $i_s$. The position angle of the stator current vector is defined in sector selector block 2 which checks the position angle of the rotating current vector. When the position angle changes, the current vector moves from one sector to another. The sector selection block produces as output the logic variable κ which, in the case of the example in FIG. 1, can obtain six different values. The value of the variable κ indicates what the direction of the current vector is and, by using the optimum switching table 1, the required output voltage vector can be selected on the basis of all three logic variables so as to control the electrical machine in the desired manner.

The method of the invention is implemented at its simplest by utilizing the inverter of the invention which comprises phase-specific switching components generating the output voltage, an optimum switching table arranged to select a switching combination for the switching components on the basis of defining values, and a frequency definition element arranged to determine the rotation speed of the electrical machine controlled by the inverter. The inverter of the invention also comprises a selection element 5 arranged to change the defining values used as basis for the switching combination of the switching components depending on the rotation speed of the electrical machine. In the example in FIG. 1, the selection element 5 comprises three change-over switches, by means of which the defining values used by the inverter are changed. The change is performed depending on the frequency of the electrical machine.

According to a preferred embodiment of the invention, the inverter comprises a current definition element arranged to define the stator current vector $i_s$ of the electrical machine, a flux definition element arranged to define the stator flux vector $\psi_s$, of the electrical machine, and a torque definition element arranged to define the torque $t_e$ of the electrical machine. In addition, according to the preferred embodiment, the defining values used as basis for the switching combination of the switching components comprise alternatively either the position angle of the stator flux vector $\psi_s$, the difference between the squares of the absolute values of the stator flux reference vector $\psi_{s,\,ref}$ and the stator flux vector $\psi_s$, and the difference between the reference torque $t_{e,\,ref}$ and the torque $t_e$ of the electrical machine, or the position angle of the stator current vector $i_s$, the difference between the squares of the absolute values of the stator current reference vector $i_{s,\,ref}$ and the stator current vector $i_s$, and the vector product of the stator current reference vector $i_{s,\,ref}$ and the stator current vector $i_s$. The frequency converter thus selects the defining values it uses from the above defining values depending on the rotation speed of the electrical machine.

According to a preferred embodiment of the invention, the inverter further comprises a selection element 6 arranged to select the reference stator flux to be used according to the frequency of the electrical machine. In current control, i.e. when operating at low rotation speeds of the electrical machine, the magnitude of the reference stator flux can be set to differ from the value used in direct torque control. In FIG. 1, the reference stator flux selected with the selection element 6 is forwarded to a ramping block 7 with which it is possible to ensure a controlled and even transfer from one reference variable to another during the change.

It is obvious to a person skilled in the art that the basic idea of the invention can be implemented in many different ways. The invention and its embodiments are thus not restricted to the examples described above, but can vary within the scope of the claims.

What is claimed is:

1. A method for controlling an electrical machine while it is connected to an inverter comprising phase-specific switching components generating an output voltage and an optimum switching table arranged to select a switching combination for the switching components on the basis of stator flux and torque of the electrical machine, the method comprising steps of:

defining a stator current vector ($i_s$) of the electrical machine, and defining a rotation speed of the electrical machine, comprising defining a switching combination for the switching components on the basis of:

the stator current vector ($i_s$) and a stator current reference vector ($i_{s,\ ref}$) of the electrical machine when the determined rotation speed is lower than a predefined limit, and the stator flux and torque of the electrical machine when the determined rotation speed is higher than the predefined limit.

2. A method as claimed in claim 1, wherein the definition of the switching combination for the switching components of the inverter comprises the steps of:

calculating a difference of squares of absolute values of the stator current reference vector ($i_{s,\ ref}$) and the defined stator current vector ($i_s$) to obtain a reference amplitude ($\phi_{ref}$), calculating a vector product between the stator current reference vector ($i_{s,\ ref}$) and the defined stator current vector ($i_s$) to obtain a reference ($\tau_{ref}$), and defining the switching combination for the switching components on the basis of signs of the reference amplitude ($\phi_{ref}$) and the reference ($\tau_{ref}$) and position angle of the stator current vector ($i_s$).

3. An inverter comprising phase-specific switching components generating an output voltage, an optimum switching table arranged to select a switching combination for the switching components on the basis of defining values, and a frequency definition element arranged to determine a rotation speed of an electrical machine controlled with the inverter, said inverter comprising:

a selection element arranged to change the defining values used as basis for the switching combination of the switching components depending on the rotation speed of the electrical machine, the defining values being one of:

a stator current vector ($i_s$) and a stator current reference vector ($\psi_{s,\ ref}$) of the electrical machine when the determined rotation speed is lower than a predetermined limit, and a stator flux vector ($\psi_s$) and a torque ($t_e$) of the electrical machine when the determined rotation speed is higher than the predetermined limit.

4. An inverter as claimed in claim 3, comprising a current definition element arranged to define the stator current vector ($i_s$) of the electrical machine, a flux definition element arranged to define the stator flux vector ($\psi_s$) of the electrical machine, and a torque definition element arranged to define the torque ($t_e$) of the electrical machine, wherein the defining values used as basis for the switching combination of the switching components comprise alternatively either:

a position angle of the stator flux vector ($\psi_s$), the difference between squares of absolute values of the stator flux reference vector ($\psi_{s,\ ref}$) and the stator flux vector ($\psi_s$), and the difference between reference torque ($t_{e,\ ref}$) and the torque ($t_e$) of the electrical machine, or a position angle of the stator current vector ($i_s$), the difference between squares of absolute values of a stator current reference vector ($i_{s,\ ref}$) and the stator current vector ($i_s$), and the vector product of the stator current reference vector ($i_{s,\ ref}$) and the stator current vector ($i_s$).

5. An inverter as claimed in claim 3, wherein the inverter further comprises a selection element arranged to select a used reference stator flux according to the frequency of the electrical machine.

* * * * *

UNITED STATES PATENT AND TRADEMARK OFFICE
CERTIFICATE OF CORRECTION

PATENT NO. : 6,597,148 B1
DATED : July 22, 2003
INVENTOR(S) : Markku Niemela

It is certified that error appears in the above-identified patent and that said Letters Patent is hereby corrected as shown below:

<u>Title page,</u>
Item [30], Foreign Application Priority Data, should read
-- February 15, 1999 (FI)………....990301 --
Item [73], Assignee, should read
-- ABB Oy, Helsinki (FI) --

Signed and Sealed this

Ninth Day of December, 2003

JAMES E. ROGAN
*Director of the United States Patent and Trademark Office*